April 14, 1964     O. C. HOWARD     3,129,317
HEATED DINNER TRANSPORT APPARATUS
Filed June 11, 1963     2 Sheets-Sheet 1

INVENTOR
OSCAR C. HOWARD
BY Williamson & Palmatier
ATTORNEYS

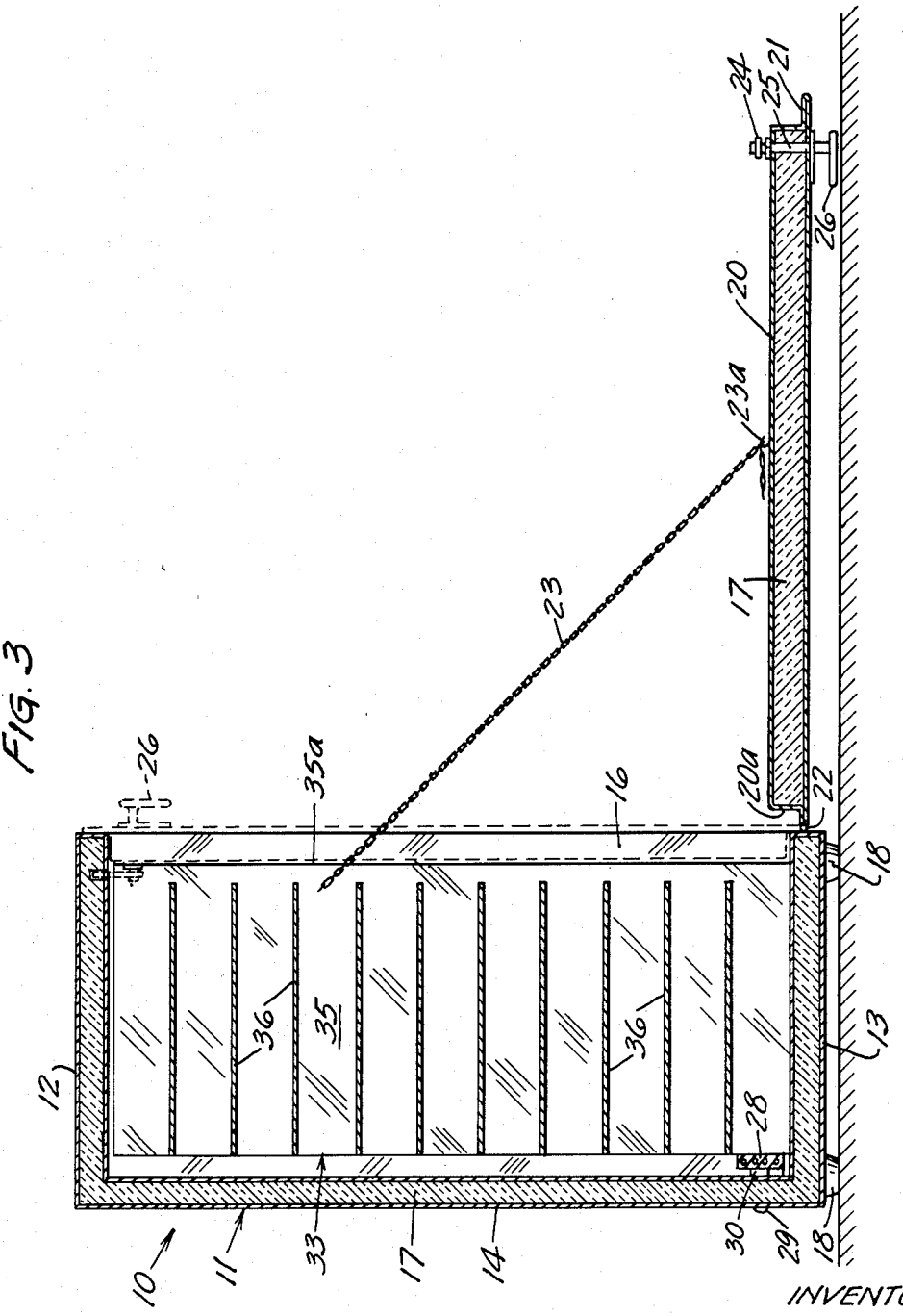

3,129,317
HEATED DINNER TRANSPORT APPARATUS
Oscar Curtis Howard, 4317 Oakland Ave. S.,
Minneapolis, Minn.
Filed June 11, 1963, Ser. No. 287,066
3 Claims. (Cl. 219—35)

This invention relates to portable food carrying apparatus for use in conveniently transporting a plurality of dinners while in the heated condition from one location to another.

It is a general object of this invention to provide a novel portable food transporting apparatus, of simple and inexpensive construction, for conveniently transporting a plurality of dinners from one location to another and including a housing, preferably insulated, having an article supporting shelf structure therein and having a combination closure panel which serves to cooperatively clamp the article supporting structure against accidental tilting while the food is being transported and defines a serving table when in the opened condition.

Another object of this invention is to provide a novel and improved portable food transporting apparatus of the class described having an electrical heating element therein with provision for ready connection to a conventional electrical outlet so that the food may be maintained in heated condition during transport thereof and also permitting reheating of the food when desired.

A more specific object of this invention is to provide a novel and improved portable food transporting apparatus capable of being conveniently carried and including an insulated housing having a closure panel swingably mounted thereon to permit access to the interior of the housing, the closure panel being oriented in substantially horizontal relation when in the open position to define a serving table, and an article supporting shelving structure positioned within the housing and being clamped therewithin by the closure panel to preclude any tilting thereof, but being arranged an constructed to permit effective circulation of the heated air throughout the housing so that a substantially uniform temperature is maintained therewithin.

These and other objects and advantages of my invention will more fully appear from the following description made in connection with the accompanying drawings wherein like character references refer to the same or similar parts throughout the several views, and in which:

FIG. 3 is a cross sectional view taken approximately along a vertical plane and with the closure panel thereof illustrated in the open position and being illustrated in the closed position by dotted line configuration.

Figure 1:
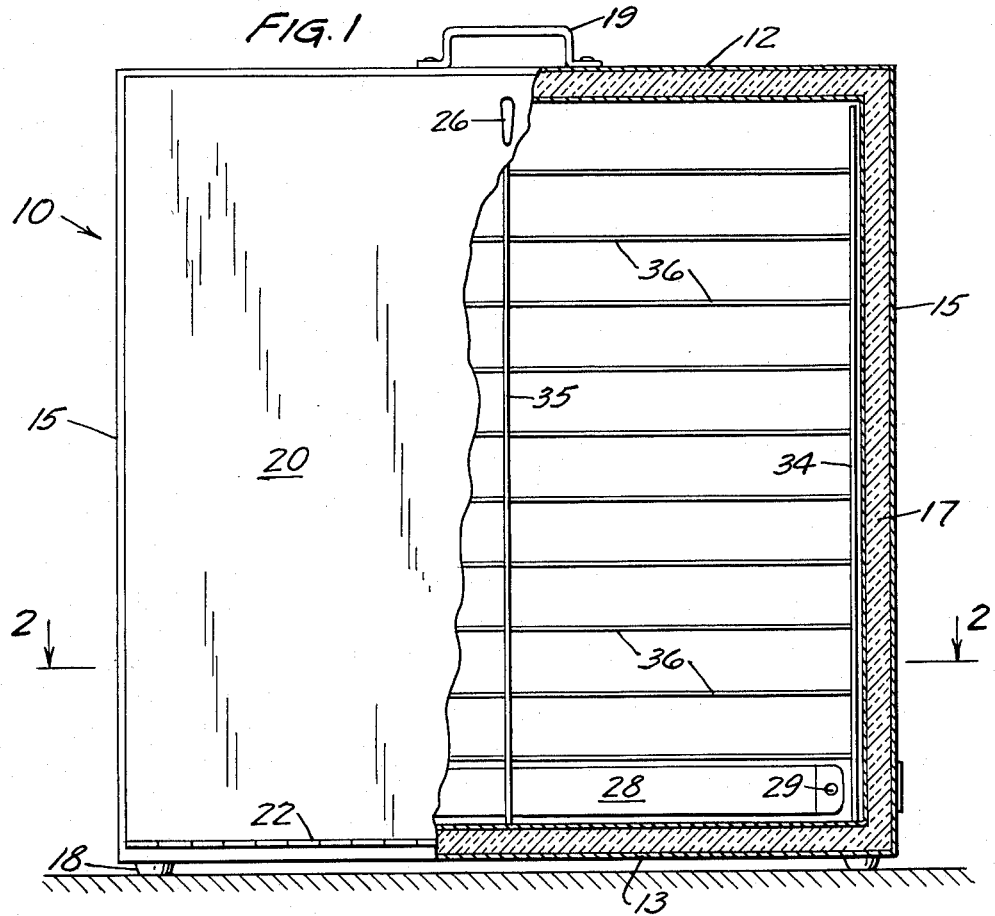
FIG. 1 is a front elevational view of the invention with certain parts thereof broken away for clarity.

The embodiment of my heated dinner transport apparatus, designated generally by the reference numeral 10 is comprised of a housing 11 which as seen is of generally rectangular configuration. The housing 11 includes a top wall 12, bottom wall 13, rear wall 14 and opposed side walls 15. It will be noted, as best seen in FIG. 3, that the entire front side of the housing 11 is open as at 16.

The respective walls of the housing 11 are of laminated construction, the respective external laminates being formed of a rigid metallic material, preferably stainless steel, with a thermal insulating material 17 being interposed between the outer laminates. The outer laminate of the lower or bottom wall 13 is provided with suitable support feet 18 while the top wall 12 is provided with a suitable carrying handle 19 to facilitate carrying of the housing.

Figure 2:
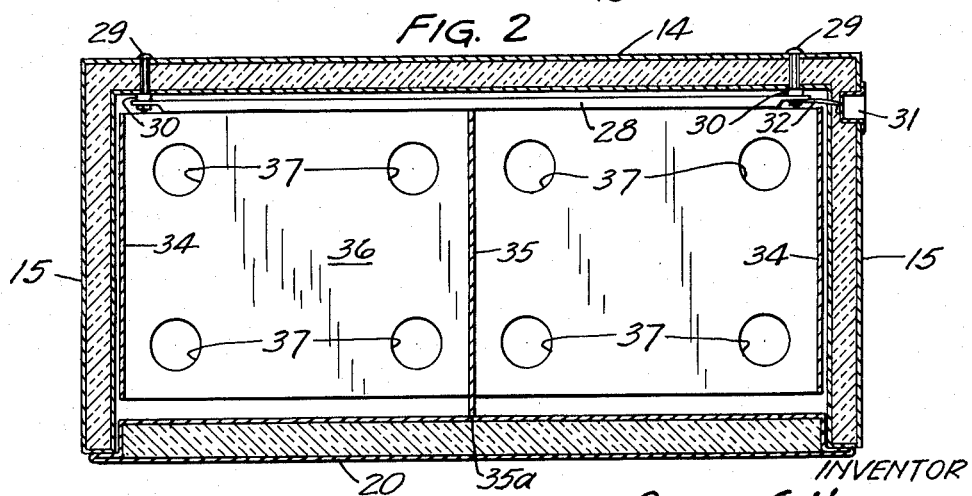
FIG. 2 is a transverse cross sectional view taken approximately along line 2—2 of FIG. 1 and looking in the direction of the arrows.

Means are provided for closing the open front side 16 and this means includes a closure panel 20. This closure panel 20 is preferably formed of stainless steel and is of hollow construction with an insulating material 17 interposed between the respective external layers, the thermal insulating material being identical to that used in the respective walls of the housing 11. It will be noted, as best seen in FIGS. 2 and 3, that the combination closure panel and serving table 20 is of a size to fit snugly within the open side 16 of the housing 11 when this combination closure panel and serving table is in the closed position.

It will also be seen that the closure panel is provided with peripheral flanges 21 coextensive with the outer front surface of the panel and which lie against the respective front edges of the top, bottom and side walls of the housing when the panel is in the closed position. Hinge means 22 hingedly connect the lower peripheral flange portion of the closure panel 20 to the front edge of the bottom wall 13 to thereby permit swinging movement of the closure panel between open and closed relation with respect to the open front side 16 of the housing 11.

Means are also provided for limiting outward swinging movement of the closure panel 20 and to this end it will be seen that a pair of elongate flexible link chains 23 are provided and each extends between and is connected to the closure panel adjacent one side thereof and one of the side walls 15. Referring again to FIG. 3, it will be noted that the chains 23 are of a length to orient the closure panel 20 in substantially horizontal relation when in the open position so that the closure panel actually defines a serving table when so horizontally disposed. It will also be seen that each of the chains 23 has the lower end link element thereof detachably connectible to a hook 23a which is mounted on the marginal edge of the panel 20, so that each chain may be disconnected from the panel to thereby allow the closure panel to swing downwardly beyond the horizontal position.

Referring again to FIG. 3 it will be seen that the hinge connection 22 for the closure panel 20 is so located that the lower edge 20a of the closure panel projects above the upper surface of the bottom wall 13 when the closure panel is in the open position. It will also be noted that the closure panel 20 is provided with a latch element 24 which is in the form of a bar affixed to one end of a rock shaft 25, the latter projecting through the closure panel adjacent the upper central portion thereof. The rock shaft 25 has a handle 26 affixed thereto to facilitate rotation of the rock shaft and corresponding rotative movement of the latch element 24. The upper wall 12 is provided with a latch receiving recess 27 with means therein for releasably retaining the latch element in latched relation therein. Thus it will be seen that the closure panel may be releasably locked in the closed position while the housing is being transported from one location to another.

Means are also provided for heating the interior of the housing 11 to maintain the food therein in the heated condition and to reheat the food at such time when the food becomes undesirably cooled. To this end it will be seen that an elongate generally horizontally oriented heating element 28 is provided which is mounted on the inner surface of the rear wall 14 adjacent the lower portion thereof. The heating element 28 is mounted on the inner surface of the rear wall by suitable bolts 29, as best seen in FIG. 2, with insulating spacer elements 30 interposed between the inner surface of the rear wall 14 and the heating element. It will be seen that the heating element 28 is connected to a conventional female bayonet type electrical socket 31 by suitable electrical conductor means 32, as best seen in FIG. 2, to permit ready connection of the conventional male bayonet type socket member thereto.

An article supporting shelf structure designated generally as 33 is removably positioned within the interior or chamber of the housing 11 and it will be seen that this supporting shelf structure is of generally rectangular configuration and substantially fills the volumetric space defined by the housing chamber. The supporting shelf structure 33 includes a pair of vertical end plate members 34 and a central or intermediate plate member 35 rigidly interconnected together by a plurality of horizontally disposed generally vertically spaced-apart shelf members 36. It will be noted that the shelf members 36 are provided with symmetrically arranged vertical apertures therein to permit the passage of heated air or gas therethrough.

It will also be noted that the shelf members 36 are of substantially flat rectangular configuration and have their respective front edges disposed in substantially vertical coplanar relationship and also have their respective rear edges disposed in substantially vertical coplanar relationship with respect to each other. It will further be noted that the front edge 35a of the central plate 35 projects forwardly beyond the end plates 34 and forwardly beyond the front edges of the shelf members 36 so that when the closure panel 20 is in closed relation, the inner surface of the panel abuts against this front edge 35a. This structural arrangement provides an air space between the front edges of the shelf members and the inner surface of the closure panel. The lower rear edge portion of the supporting shelf structure 33 in the embodiment shown engages the heating element 29 whereby the supporting shelf structure is clamped against tilting movement when the apparatus is being transported from one location to another.

It will also be noted that because of the close tolerances of the supporting shelf structure 33 with respect to the interior of the housing 11, the closure panel 20 must be swung downwardly beyond its horizontal position to permit removal of the article supporting shelf structure. Thus it will be seen that the rear edge 20a of the closure panel 20 is disposed in obstructing relation with respect to the vertical plate members of the supporting shelf structure when the closure panel is in the open position so that inadvertent removal of the supporting shelf structure is precluded.

When the heated dinner transport apparatus 10 is used, the supporting shelf structure 33 will be disposed within the housing 11 and a plurality of plates, platters or the like containing complete dinners thereon will be placed on the shelf members 36. The closure panel will be latched in the closed position thus permitting a user to conveniently carry the dinners from one location such as a kitchen to the dining hall. If an unforeseeable delay is experienced, the user merely has to connect the female socket member 31 through the mediary of conventional electrical conductors to an electrical outlet whereby the dinners within the housing may be readily heated. It is pointed out that each shelf member 36 which traverses and interconnects the central plate member 35 of one of the end plate members 34 will accommodate a plate or platter containing a complete dinner. Thus when the closure panel 20 is unlatched and swung from the closed to open position, the closure panel will define a serving table for accommodating several such plates or platters. With this arrangement removal and subsequent serving of the heated dinners is facilitated.

Because of the clamped relation of the central plate 35 between the closure panel and the heating element, tilting of the supporting shelf structure is precluded during transport of the apparatus so that the platters may be handled without the attendant danger of easy spillage of the contents thereon. The obstructing relation of the rear edge 20a of the closure panel 20 when the latter is in the open position with respect to the supporting shelf structure serves to retain the supporting shelf structure within the housing 11. When it is desirable to remove the supporting shelf structure, it is merely necessary to disconnect each chain from its associated hook 23a whereby to permit downward swinging of the closure panel 20. Thereafter the supporting shelf structure may be easily removed from within the housing for cleaning or the like.

It will be seen that the central plate member 35 also serves to space the respective front and rear peripheral portions of the supporting shelf structure from the inner surfaces of the closure panel and rear wall whereby to permit ready circulation of heated air during the heating operation. As pointed out above, the apertures in each shelf member also facilitates circulation of the heated air so that a substantially uniform temperature may be maintained within the housing.

It will therefore be seen from the preceding description that I have provided a novel heated dinner transporting apparatus including an insulated housing having a supporting shelf structure therein which is arranged and constructed to permit a plurality of heated dinners to be transported while the danger against tilting and spillage is minimized, if not precluded.

It will also be seen from the foregoing description that my novel dinner transporting apparatus includes a closure panel which functions as a serving table when in the open condition and which prevents any accidental removal of the shelf supporting structure during removal of the platters thereon.

Thus it will be seen that I have provided a novel heated dinner transporting device which is of simple and inexpensive construction and operation, and one which functions in a more efficient manner than any heretofore known comparable devices.

It will of course be understood that various changes may be made in the form, details, arrangement and proportions of the various parts without departing from the scope of my invention.

What is claimed is:

1. Heated transport apparatus for use in transporting a plurality of food-containing receptacles, said apparatus comprising a generally rectangular shaped housing having a top, bottom and side walls and having an open front side, said housing defining a generally rectangular chamber therewithin, an electrical heating element mounted within said chamber and being connectible to a source of electrical current to permit ready heating of said chamber, a generally rectangular shaped article supporting shelf structure removably mounted within and substantially filling the volumetric space defined by said chamber, said shelf structure including a centrally located vertical support plate member having a plurality of substantially similar vertically spaced-apart, horizontally oriented supporting shelf members affixed thereto and projecting laterally from opposite sides thereof, said vertical support plate member traversing the interior of said chamber and having one edge thereof positioned closely adjacent the open side of said housing and projecting beyond the adjacent edges of said shelf members, a closure panel for closing said open front side of the housing, hinge means hingedly connecting said closure panel along its lower edge to said housing to permit vertical swinging movement of said panel about a horizontal transverse axis between open and closed positions with respect to said open side, means extending between and interconnected with said housing and said closure panel to retain the latter in substantially horizontal relation when in the open position whereby said closure panel defines a serving table, the lower edge of said closure panel being disposed in substantially obstructing relation with respect to said vertical plate when said panel is in the open position, and said closure panel having the inner surface thereof disposed in abutting relation with said vertical support plate when said panel is in the closed position to clamp the supporting shelf structure against movement within the housing and spacing the front edges of said shelf members from said closure panel.

2. Heated transport apparatus for transporting a plurality of food-containing receptacles, said apparatus comprising a generally rectangular shaped housing having insulated top, bottom and side walls and having an open front side, said housing defining a generally rectangular shaped chamber therewithin, an electrical heating element mounted within said chamber and being connectible to a source of electrical current to permit ready heating of the chamber, a generally rectangular shaped article supporting shelf structure removably mounted within and substantially filling the volumetric space defined by said chamber, said shelf structure including a pair of vertical end plate members and a central vertical plate member, a plurality of substantially identical, vertically spaced-apart, horizontally oriented, apertured shelf members each being affixed to said central plate member and one of said end plate members, the front edges of said end plate members and said shelf members being disposed in substantially vertical coplanar relation, said central plate member traversing the interior of said chamber and having its front edge positioned closely adjacent the open side of said housing and projecting beyond the front edges of said shelf members, an insulated closure panel for closing said open front side of said housing, hinge means hingedly connecting said closure panel adjacent its lower edge to said housing to permit vertical swinging movement of said panel about the horizontal transverse axis between open and closed positions with respect to said open front side, said closure panel having the inner surface thereof disposed in abutting relation with said central plate member when said panel is in the closed position to clamp the supporting shelf structure against movement within the housing while spacing the front edges of said shelf member from said closure panel, and means extending between and interconnected with said housing and said closure panel to retain the latter in substantially horizontal relation when in the open position whereby said closure panel defines a serving table, the lower edge of said closure panel being disposed in substantially obstructing relation with respect to said central plate member when said panel is in the open position.

3. Heated transport apparatus for use in transporting a plurality of food-containing receptacles, said apparatus comprising a generally rectangular shaped housing having insulated top, bottom and side walls and having an open front side, said housing defining a generally rectangular shaped chamber therewithin, a carrying handle affixed to the upper surface of said top wall and projecting upwardly therefrom, an electrical heating element mounted on the inner surface of said rear wall adjacent the lower portion thereof and being connectible to a source of electrical current to permit ready heating of said chamber, a generally rectangular shaped article supporting shelf structure removably mounted within and substantially filling the volumetric space defined by said chamber, said shelf structure including a pair of vertical end plate members and a central vertical plate member, a plurality of identical vertically spaced-apart, horizontally oriented shelf members each being affixed to said central plate member and one of said end plate members, the respective front edges of said end plate members and said shelf member being disposed in substantially vertical coplanar relation and said central plate member traversing the interior of said chamber and having the front edge thereof positioned closely adjacent the open side of said housing and projecting forwardly beyond the respective front edges of said shelf member, an insulated closure panel hingedly connected adjacent its lower edge to said housing to permit vertical swinging movement of said panel about a horizontal transverse axis between open and closed positions with respect to said open side, said closure panel having the inner surface thereof disposed in abutting relation with said central plate member when said panel is in the closed position to clamp the supporting shelf structure against movement within the housing and spacing the front edges of said shelf members from said closure panel, and elongate chain means connected to said housing and being releasably connectible with said closure panel to retain the latter in substantially horizontal relation when in the open position whereby said closure panel defines a serving table, the lower edge of said closure panel being disposed in substantially obstructing relation with respect to said vertical plate when said panel is in the open position, and said closure panel being swingable downwardly beyond said horizontal position when said chain means is disconnected to permit removal of said supporting shelf structure from said housing.

References Cited in the file of this patent

UNITED STATES PATENTS

| | | |
|---|---|---|
| 1,590,692 | Lewis | June 29, 1926 |
| 2,490,076 | Maxson | Dec. 6, 1949 |
| 2,831,098 | Luscher | Apr. 15, 1958 |